(12) United States Patent
Kurtz et al.

(10) Patent No.: US 6,612,178 B1
(45) Date of Patent: Sep. 2, 2003

(54) LEADLESS METAL MEDIA PROTECTED PRESSURE SENSOR

(75) Inventors: Anthony D. Kurtz, Ridgewood, NJ (US); Joseph R. VanDeWeert, Cliffside Park, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 0 days.

(21) Appl. No.: 10/144,587

(22) Filed: May 13, 2002

(51) Int. Cl.[7] ................................................. G01L 7/08
(52) U.S. Cl. ........................................... 73/715; 73/716
(58) Field of Search ...................... 73/715, 724, 721, 73/727, 720, 716; 338/4, 2; 361/283.3, 283.4

(56) References Cited

U.S. PATENT DOCUMENTS

| | | | | |
|---|---|---|---|---|
| 4,653,329 A | * | 3/1987 | Sagara et al. ................. 73/726 |
| 4,814,856 A | * | 3/1989 | Kurtz et al. ................... 338/4 |
| 5,587,601 A | * | 12/1996 | Kurtz ........................ 257/417 |
| 5,939,639 A | * | 8/1999 | Lethbridge ................... 73/724 |
| 5,973,590 A | | 10/1999 | Kurtz et al. .................. 338/42 |
| 6,070,469 A | * | 6/2000 | Taniguchi et al. ............ 73/720 |

* cited by examiner

Primary Examiner—Andrew H. Hirshfeld
Assistant Examiner—Marissa Ferguson
(74) Attorney, Agent, or Firm—Duane Morris LLP

(57) ABSTRACT

In order to provide environmental protection, a leadless sensor of the type having a central boss is secured within a composite metal housing consisting of a top metal housing having a central boss which communicates with the central boss of the sensor. The top housing has a thin top portion surrounded by a peripheral portion, which peripheral portion is epoxied or otherwise secured to a bottom metallic housing having an internal hollow for accommodating the pressure sensor and the glass backing wafer, both of which are secured to a header which accommodates terminal pins associated with the active elements on the sensor device.

10 Claims, 2 Drawing Sheets

LEADLESS METAL MEDIA PROTECTED PRESSURE SENSOR

FIELD OF INVENTION

The present invention relates to semiconductor transducers and more particularly, to a leadless transducer having a metal media protected member, whereby pressure is applied to the metal member and transmitted to the leadless transducer.

BACKGROUND OF THE INVENTION

Semiconductor pressure transducers are frequently used in applications which require operation in harsh environments that are corrosive and/or involve high temperature. Accordingly, the stress-sensing network of transducers used in such applications must be protected from these harsh environmental conditions in some way in order for the transducer to remain operational over extended periods of time. In the past, surface overcoatings such as silicon nitride, silicon dioxide and the like, have been provided over the stress-sensing network for protection from harsh operating environments.

In any event, a new device or class of sensors has been developed and is referred to by the assignee herein as "leadless sensors". Reference is made to U.S. Pat. No. 5,973,590 entitled, "Ultra Thin Surface Mount Wafer Sensor Structures and Methods for Fabricating the Same" which issued on Oct. 26, 1999 to A. D. Kurtz et al. and is assigned to the assignee here, Kulite Semiconductor Products, Inc. That patent describes a leadless sensor which involves an improved method for hermetically sealing a semiconductor pressure transducer and for providing superior operating characteristics. A hermetically sealed sensor, according to the above-noted patent, which is incorporated herein by reference, is formed by fusion-bonding a P+ sensor network, P+ fingers which also contain contact areas and a P+ rim to an oxide coated diaphragm wafer and then electrostatically bonding a piece of glass having apertures smaller than the fingers which line up with the contact regions on the sensor. The diaphragm wafer is formed to provide a series of flexible diaphragm structures underneath the sensor network and the glass wafer has a series of depressions on the side that is sealed to the P+ fingers and rim such that the sensor network will not seal to the glass and of a sufficient depth to allow the diaphragm to deflect. Many different embodiments of the structure have been shown in the above-noted patent and other patents which are related thereto.

In any event, such a leadless sensor exhibits superior protective operation compared to prior art sensors, but still require, for certain applications, greater protection. For example, prior art transducers have been employed in many different environments that subject the transducer to stringent operating conditions, such as high temperature and high pressure. Such transducers have been used in the automotive field to monitor engine pressure, coolant pressure and so on. They are used in the aircraft field to measure aerodynamic pressures and in many other varied fields, where high pressure and temperatures are a concern. Apart from the high operating temperatures and pressures, the transducers have been subject to various pollutants and gasses which are present in such environments. Therefore, even though the leadless transducer is hermetically sealed and protected, it still can be compromised by a highly corrosive environment. Therefore, the present invention describes a leadless transducer which is protected by a metal diaphragm structure attached to the housing. The metal diaphragm structure is shaped so that a center boss portion of the metal diaphragm co-acts with the boss on the leadless transducer to apply a force thereto. The metal diaphragm structure operates to enclose the leadless sensor and prevents the sensor from being exposed to a harsh environment. See U.S. Pat. No. 5,587,601 entitled, "Support Structure for a Semiconductor Pressure Transducer" which issued on Dec. 24, 1996 to A. D. Kurtz and is assigned to the assignee herein. This patent shows metal structures operating with sensors.

SUMMARY OF INVENTION

A pressure sensor comprises a first cylindrical metal member which has a closed top surface and an opened bottom surface, the closed top surface has a central boss extending towards the open bottom surface, and a second cylindrical metal member has an inner recess surrounded by a flange, with the outer surface of the second cylindrical member secured to the periphery about the open bottom surface of the first metal member. A leadless semiconductor sensor has a central boss surrounded by an active deflecting region to enable the sensor to produce an output when a pressure is applied to the boss, the sensor is positioned on an insulator support member and located in the inner recess of the second cylindrical member with the insulator support member positioned on the flange, with the central boss of the sensor in contact with the central boss of the first cylindrical metal member to cause a force applied to the closed top surface of the first cylindrical member to be applied to the sensor via the associated bosses.

DETAILED DESCRIPTION OF THE FIGURES

Figure 1:
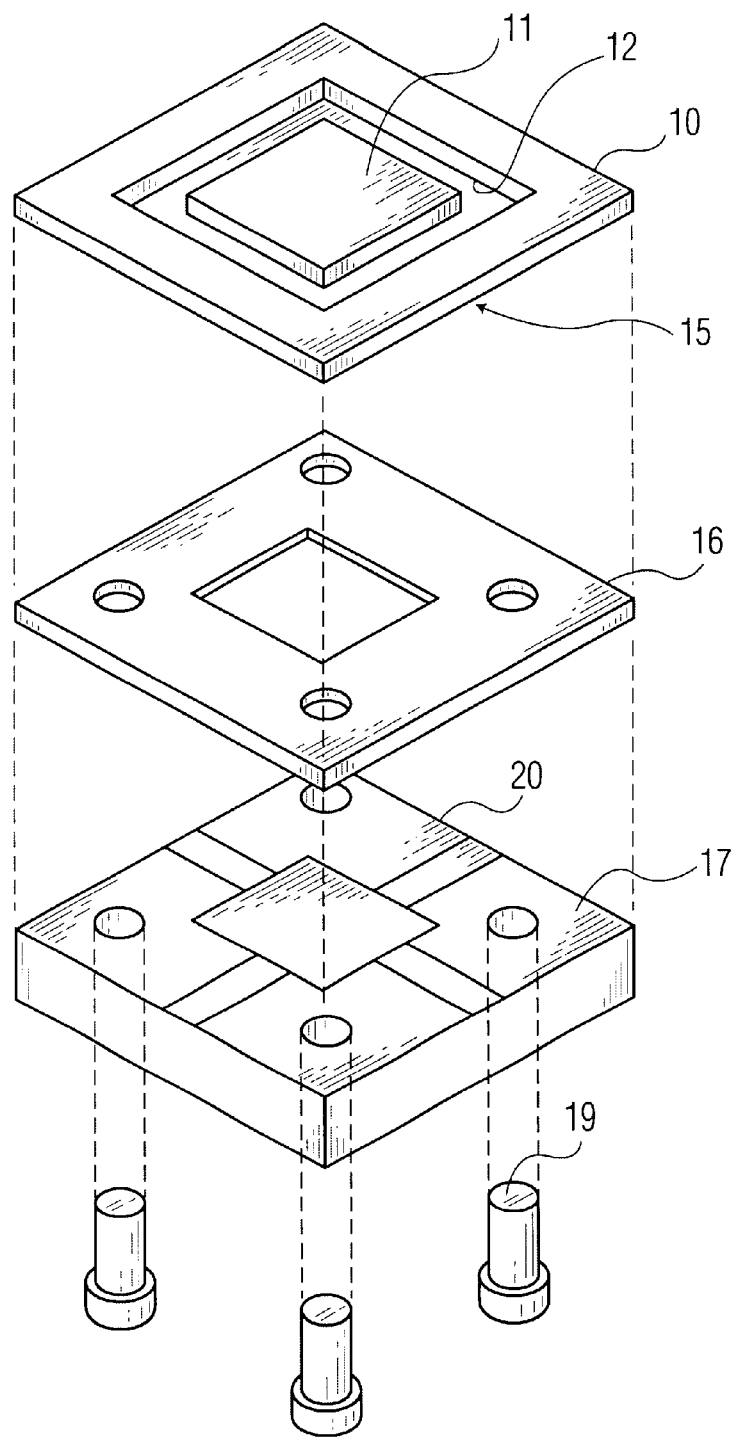
FIG. 1 is a perspective view of a leadless sensor device employed in the present invention.
Figure 2:
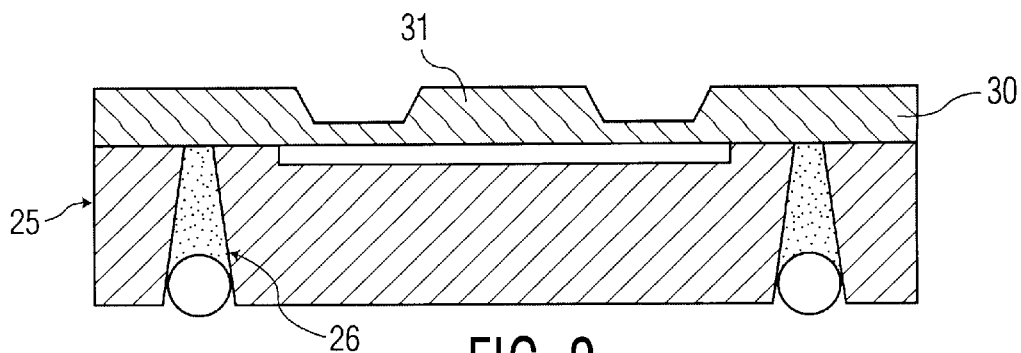
FIG. 2 is a cross sectional view of an alternate embodiment of a sensor device which can be employed in the present invention.

Referring to FIG. 1, there is shown a sensor, which is designated as a leadless type sensor as evidenced in the above-noted U.S. Pat. No. 5,973,590. FIG. 1 is directly equivalent to FIG. 6 of the above-noted patent. Numeral 10 represents a silicon sensor, which is viewed from the back and essentially, as seen, the silicon sensor 10 has a central boss 11 which is surrounded by a frame or depression 12 which constitutes the active area of the device. The silicon sensors are located and positioned on the bottom side or surface 15 of the wafer in the active area or the deflecting region. FIG. 2 of the U.S. Pat. No. 5,973,590 patent shows the configuration of the silicon sensors as positioned in the active area of the diaphragm. It is also explained in the above-noted patent as seen in FIG. 1, there is a glass mounting chip 16 positioned between the silicon sensor 10 and a second glass wafer 17. The second glass wafer has a segmented sputtered layer 20 of silicon disposed on a surface that is to be adjacent to the first glass wafer 16. In this manner, a thin layer of Pyroceram glass may be disposed on the same surface. When the second glass wafer 17, having a sputtered silicon disposed on the surface is used and a second glass wafer is electrostatically bonded to the first glass wafer 16, the apertures of the sensors are filled with a conductive frit material, preferably a gold frit as explained in the above-noted patent. Basically, the configuration of FIG. 1, as indicated, is shown as FIG. 6 in the U.S. Pat. No. 5,973,590 patent and basically is a leadless sensor configuration. The terminals 19 are directed through apertures and contact the frit in the apertures of the sensors.

Referring to FIG. 2 there is shown a leadless sensor as shown in the above-noted '590 patent in FIG. 10. Essentially, in this embodiment, a single glass wafer 25 of about a thickness of 0.03 inches is used. The apertures 26 on the side of the glass that contact the silicon are slightly larger than the metallized regions, but smaller than the width of the fingers of the sensors to ensure hermetic seals. The apertures 26 are tapered in this embodiment to accommodate a small metallic sphere, which basically makes contact with the conductive frit located in the sensor aperture. While a metallic sphere is shown, it is understood that the frit could be in contact with conductive land areas or conductive pins. This allows, as you can see, for a leadless sensor, again where the silicon sensor 30 containing piezoresistive arrays is mounted on the top of the glass wafer. The sensor has a central boss 31. As indicated, all these embodiments are shown in U.S. Pat. No. 5,973,590, which is incorporated fully herein by reference.

Figure 3:
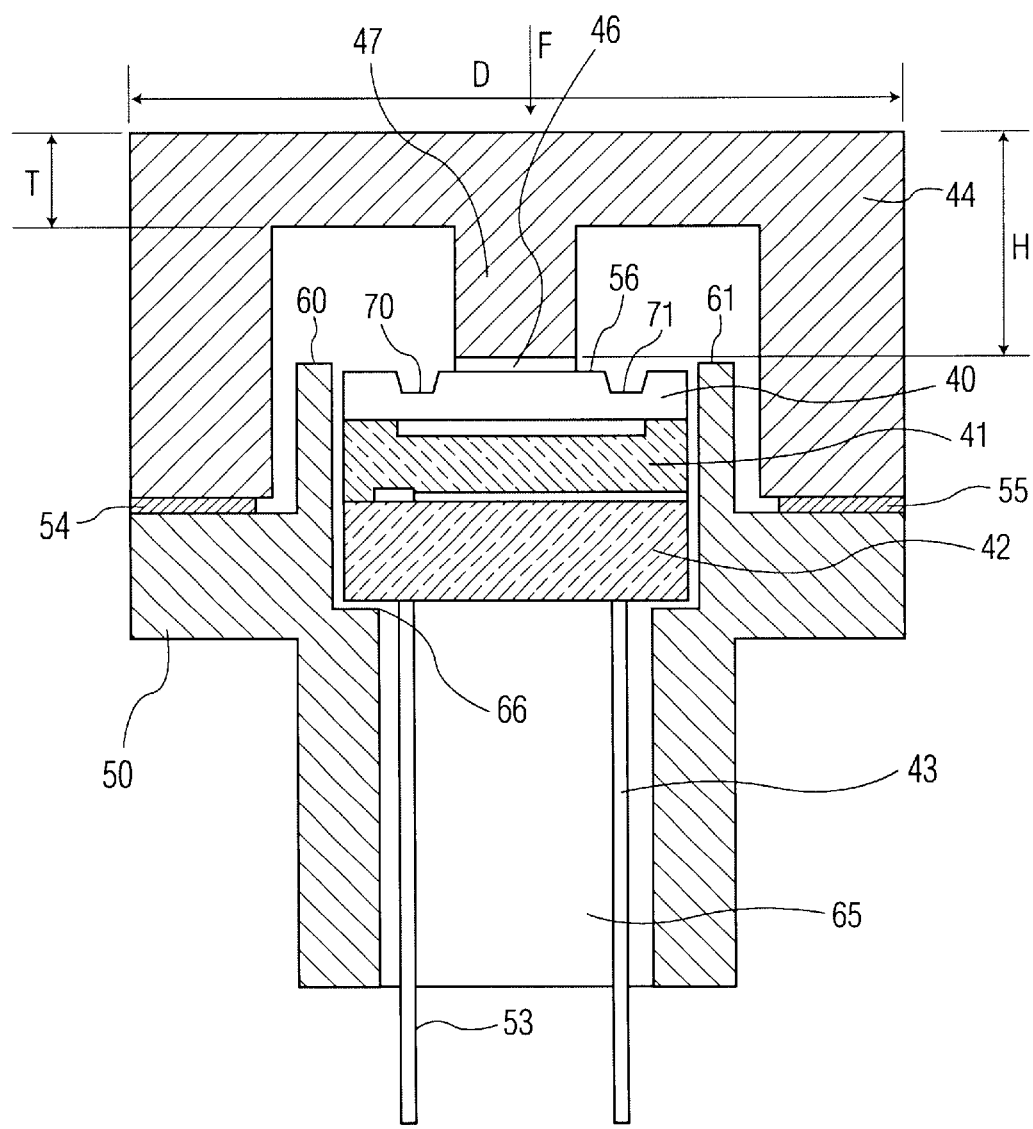
FIG. 3 is a cross sectional view of a sensor utilized in the present invention and showing a leadless pressure sensor enclosed within a metallic housing arrangement.

Referring to FIG. 3, there is shown a sensor structure according to this invention. A leadless sensor 40 having a silicon diaphragm and a frame is shown mounted on a typical glass header 41. The silicon sensor 40 and the header 41 are typically referred to as a leadless sensor. A leadless sensor such as that of FIG. 1 and FIG. 2 is placed on a transistor type header 42, which constitutes a plastic or other insulating base. The pins 43 and 53 are in contact with the leadless terminals of the sensor 40 when the sensor is placed on the top surface of the header 42. Pins 43 and 53 are shown, which again are connected to the sensor arrangement. The central boss of the sensor is coupled to an extending central boss of a first metal structure 44. The extending boss 47 of the metal structure is epoxied to the central boss 56 of the silicon sensor. Essentially, the metal structure 44 constitutes a cylindrical structure having a cylindrical central boss in contact with the central boss of the silicon structure. Right and left extending sidewalls are secured by means of epoxy bonds 54 and 55 to a second metal header 50. The inner header 50 has extending arms 60 and 61, which totally surround the silicon sensor 40 and glass wafer 41 and the transistor header 42. The second header 50 has an inner recess 65. There is an inner flange 66 upon which the transistor header 42 is positioned. The header 42 can be secured to the flange 66 by a suitable adhesive or epoxy. The header 42 as seen, is positioned within the metal header 50, which metal header 50 is secured to the metal header 44. As one can therefore see from FIG. 3, a silicon leadless sensor is completely surrounded by a metallic housing consisting of the upper housing 44 and a lower housing 50. Both housings surround the leadless sensor 40 which is positioned on the transistor-like header 42 to create a sensor where the entire sensing surface is completely protected from the media by means of stainless steel or otherwise strong metal housing. Any force applied to the top surface of housing 42, as shown in the direction of the arrow, is transmitted to the sensor by means of the boss projection 47, which is secured to the boss of the sensor by means of an epoxy or other bonding material 46.

As one can see from FIG. 3, the sensor 40 is totally protected from the surrounding environment. In this manner, the sensor or any portion of the sensor cannot be contacted by a corrosive environment which may accommodate the force. Typically, the thickness of the top section of the metal header 44 designated by T is between 0.002 to 0.003 inches thick. The distance designated by H from the top surface of header to the end of the boss is approximately 0.01 inches thick. The diameter of the metal cup is approximately 0.148 inches, having an inner diameter of 0.125 inches. Thus, as one can see, the dimensions are relatively small and provide a very good isolated pressure sensor using the leadless configuration. One can also determine from FIG. 3 that the metal boss 47 which is secured to the boss 56 of the semiconductor wafer straddles the active diaphragm areas 70 and 71. Thus, as seen, the metal boss 47 is centrally located between the diaphragm regions 70 and 71.

An unanticipated advantage of the metal isolation diaphragm 44 is its use as a force collector. Linking the metal diaphragm directly to the silicon one by the thick metal diaphragm causes both diaphragms 70 and 71 to deflect the same amount. The thickness of the diaphragm in FIG. 3 is designated as T. This means that the stiffness of the whole system is equal to the sum of both diaphragms stiffnesses. When the metal diaphragm is very thin, its stiffness is much lower than the silicon diaphragm, which it pushes down upon. This means that the silicon is responsible for almost the whole stiffness of the system and is therefore subject to almost the full force of the pressure acting on the metal diaphragm. When the metal diaphragm is made so that its diameter is much larger than the silicon, then much more force acts on the silicon diaphragm then it would if the silicon diaphragm was in the pressure media itself. In essence, the effective area of the silicon diaphragm becomes that of the metal diaphragm times a small correction factor for the actual stiffness of the metal. Because of this, it is possible to use a much higher-pressure range device to measure a relatively small pressure. This is a distinct advantage because it allows for the use of relatively thick silicon diaphragms in the measurement of very small pressures. In the past to measure these low pressures, a very thin diaphragm was used and such diaphragms have much larger non-linearities and hysteresis compared to thick diaphragms. The use of the metal diaphragm over the leadless sensor allows for a much more accurate measurement at low pressures. Below is a table of the pressure ranges of the same silicon die with and without a metal cover. It can be seen that the force multiplier effect can be as high as 11 in some cases. This force multiplier can also be controlled by altering the thickness of the metal diaphragm, thereby making it stiffer for an increased thickness allowing it to absorb more of the pressure or less stiff for a decreased thickness creating more stress in the silicon. Another way to control the force multiplier is by increasing or decreasing the diameter of the metal diaphragm, making it more or less stiff. For the numbers below, a diameter of 112 mils is used for the metal diaphragm.

| Pressure Range of Covered Leadless vs. Original Pressure Range of Die | | | | |
|---|---|---|---|---|
| Si Active (mils) | Old Pressure Range (PSI) | Metal Thickness (mils) | New Pressure Range (PSI) | Force Multiplier |
| 22 | 25 | 4 | 13.9 | 1.8 |
| 22 | 25 | 3 | 7.3 | 3.4 |
| 22 | 25 | 2 | 3.7 | 6.8 |
| 22 | 50 | 4 | 18.5 | 2.7 |
| 22 | 100 | 4 | 20.1 | 5.0 |
| 22 | 300 | 4 | 44.5 | 6.7 |
| 22 | 1000 | 4 | 91.2 | 11.0 |

-continued

Pressure Range of Covered Leadless vs. Original Pressure Range of Die

| Si Active (mils) | Old Pressure Range (PSI) | Metal Thickness (mils) | New Pressure Range (PSI) | Force Multiplier |
| --- | --- | --- | --- | --- |
| 22 | 1000 | 5 | 104.0 | 9.6 |
| 22 | 1000 | 7 | 148.0 | 6.8 |

It will become apparent to one skilled in the art that other modifications and alternate embodiments can be ascertained, all of which were deemed part of the specification as disclosed herein.

What is claimed is:

1. A pressure sensor, comprising:
   a first cylindrical metal member having a closed top surface and an opened bottom surface, said closed top surface having a central boss extending towards said open bottom surface,
   a second cylindrical metal member having an inner recess surrounded by a flange, with the outer surface of said second cylindrical member secured to the periphery about said open bottom surface of said first cylindrical member,
   a leadless semiconductor sensor having a central boss surrounded by an active deflecting region to enable said sensor to produce an output when a pressure is applied to said semiconductor sensor boss, said sensor positioned on an insulator support member and located in said inner recess of said second cylindrical member with said support member positioned on said flange, with said central boss of said sensor in contact with said central boss of said first cylindrical member to cause a force applied to the closed top surface of said first cylindrical member to be applied to said sensor via said associated bosses.

2. The pressure sensor according to claim 1 wherein said second cylindrical metal member is secured to said first cylindrical member by an epoxy bond.

3. The pressure sensor according to claim 1 further including terminal pins extending from the inner recess of said second member and connected to said sensor to provide contact areas for said sensor.

4. The pressure sensor according to claim 1 wherein said central boss of said first cylindrical member is affixed by means to said central boss of said sensor.

5. The pressure sensor according to claim 4 wherein said means is an epoxy bond.

6. The pressure sensor according to claim 1 wherein said insulator support member is fabricated from glass.

7. The pressure sensor according to claim 1 wherein said insulator support member is fabricated from plastic.

8. The pressure sensor according to claim 1, wherein said second cylindrical member has a peripheral wall extending from said flange and positioned to surround said leadless semiconductor sensor and said insulator support member.

9. The pressure sensor according to claim 1 wherein said first housing is stainless steel.

10. The pressure sensor according to claim 9 wherein said second housing is stainless steel.

* * * * *